United States Patent
Laing et al.

(10) Patent No.: US 12,008,440 B2
(45) Date of Patent: Jun. 11, 2024

(54) DYNAMIC DRILLING DYSFUNCTION CODEX

(71) Applicant: HALLIBURTON ENERGY SERVICES, INC., Houston, TX (US)

(72) Inventors: Moray Lamond Laing, Spring, TX (US); Matthew Edwin Wise, Sugar Land, TX (US); Nishant Raizada, Richmond, TX (US); Mahdi Parak, Katy, TX (US); Jeffery Lynn Grable, Katy, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 807 days.

(21) Appl. No.: 16/560,572

(22) Filed: Sep. 4, 2019

(65) Prior Publication Data
US 2021/0065050 A1 Mar. 4, 2021

(51) Int. Cl.
*G06N 20/00* (2019.01)
*G06N 5/02* (2023.01)

(52) U.S. Cl.
CPC .............. *G06N 20/00* (2019.01); *G06N 5/02* (2013.01)

(58) Field of Classification Search
CPC .................................. G06N 20/00; G06N 5/02
See application file for complete search history.

(56) References Cited

U.S. PATENT DOCUMENTS

| | | | |
|---|---|---|---|
| 6,047,241 A * | 4/2000 | Sparago | G21D 3/001 702/179 |
| 6,732,052 B2 | 5/2004 | MacDonald et al. | |
| 6,944,547 B2 | 9/2005 | Womer et al. | |
| 7,142,986 B2 | 11/2006 | Moran | |
| 7,316,278 B2 | 1/2008 | Hutchinson | |
| 10,113,408 B2 | 10/2018 | Pobedinski et al. | |
| 11,280,173 B1 * | 3/2022 | Buerger | E21B 44/00 |
| 2010/0023307 A1 * | 1/2010 | Lee | G05B 23/0254 703/7 |
| 2014/0116776 A1 | 5/2014 | Marx et al. | |
| 2015/0081221 A1 | 3/2015 | Mancini | |
| 2016/0117424 A1 * | 4/2016 | Hohl | E21B 44/00 703/2 |

(Continued)

OTHER PUBLICATIONS

International Search Report and Written Opinion for International application No. PCT/US2019/049568, mailed Jun. 3, 2020, 11 pages.

*Primary Examiner* — Abdullah Al Kawsar
*Assistant Examiner* — Tewodros E Mengistu
(74) *Attorney, Agent, or Firm* — NOVAK DRUCE CARROLL LLP

(57) ABSTRACT

Aspects of the subject technology relate to systems and methods for predicting dysfunctions in physical systems. A dysfunction codex can be provided that includes a plurality of dysfunction models for predicting one or more dysfunctions in a physical system based on one or more specific contexts of the physical system. The dysfunction codex can be applied by selecting a dysfunction model of the plurality of dysfunction models within the dysfunction codex to apply based on the one or more specific contexts of the physical system. Further, a dysfunction of the physical system can be predicted by applying the dysfunction model to input system data of the physical system to predict the dysfunction of the physical system.

18 Claims, 6 Drawing Sheets

(56) References Cited

U.S. PATENT DOCUMENTS

| | | | |
|---|---|---|---|
| 2016/0203036 A1* | 7/2016 | Mezic | G06F 11/0751 |
| | | | 714/819 |
| 2017/0328194 A1 | 11/2017 | Liu et al. | |
| 2019/0024493 A1* | 1/2019 | Johnson | G06N 20/10 |
| 2019/0325346 A1* | 10/2019 | Okanohara | G06N 20/00 |
| 2020/0051237 A1* | 2/2020 | Spivey | E21B 10/00 |
| 2020/0149354 A1* | 5/2020 | Singh | G06F 30/27 |
| 2022/0275714 A1* | 9/2022 | Madasu | E21B 44/00 |

* cited by examiner

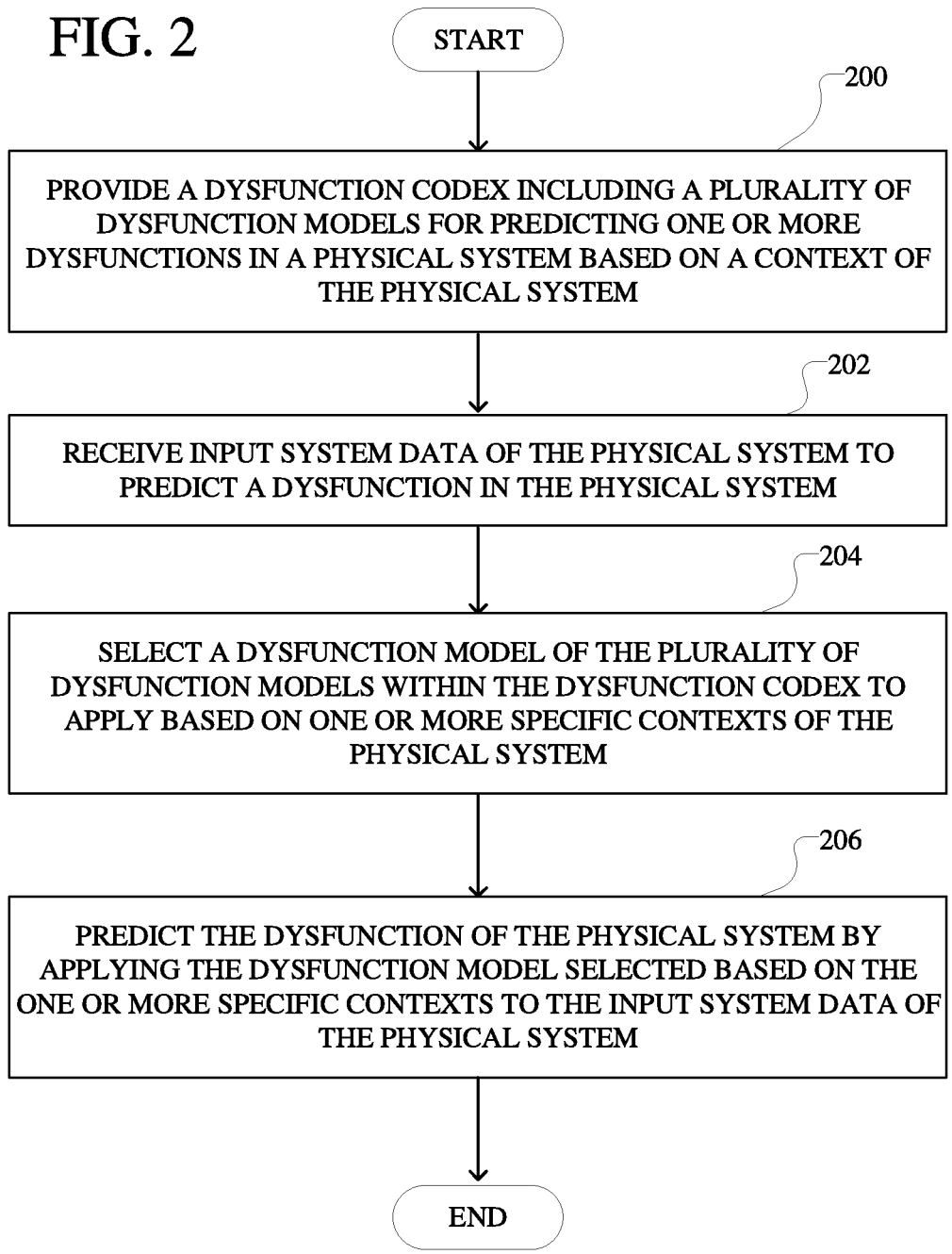

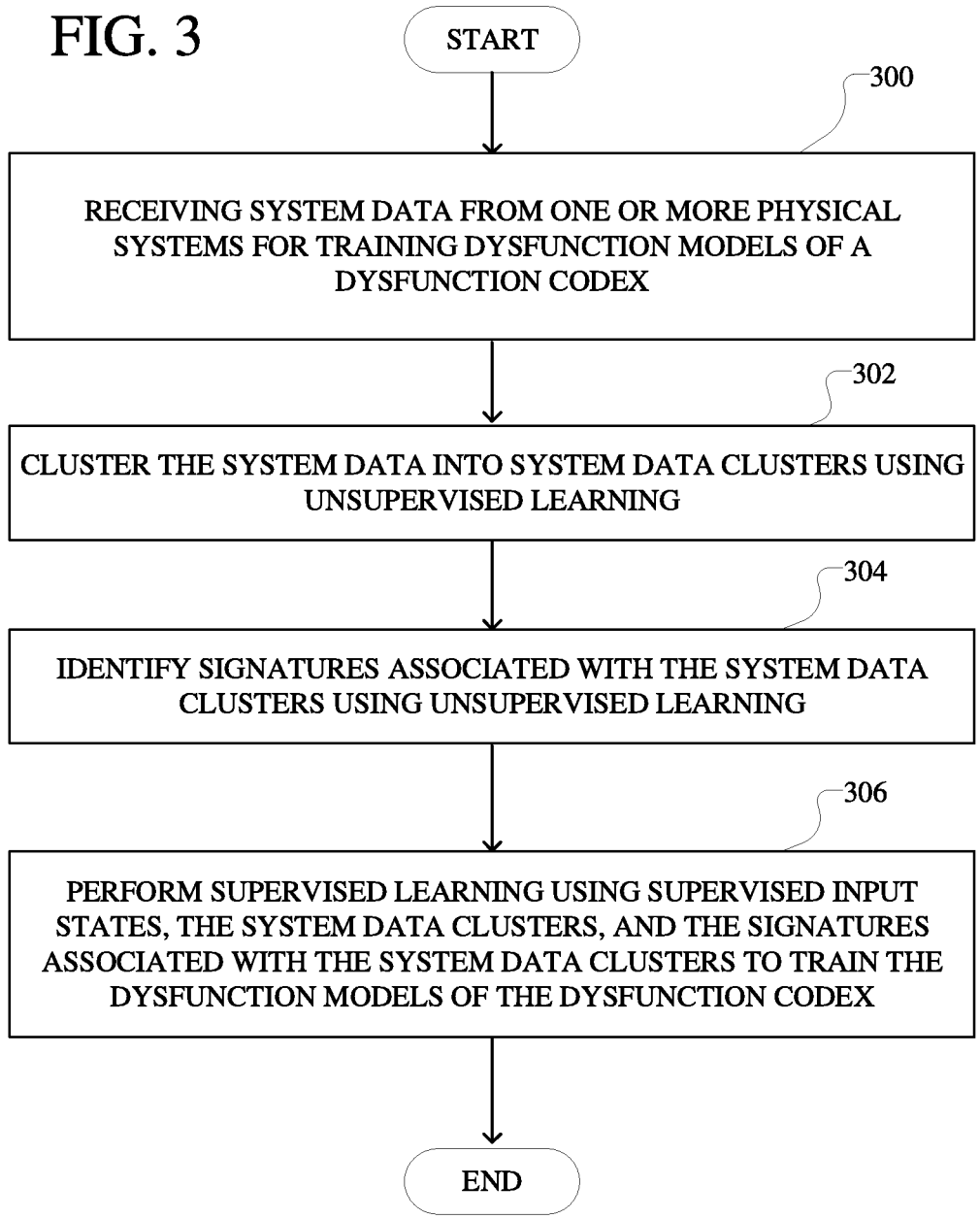

DYNAMIC DRILLING DYSFUNCTION CODEX

TECHNICAL FIELD

The present technology pertains to predicting dysfunctions in physical systems, and more particularly, to predicting dysfunctions in physical systems using a dysfunction codex that includes a plurality of dysfunction models that are selectable based on context.

BACKGROUND

Predicting dysfunctions in physical systems is advantageous for a number of reasons. Specifically, predicted dysfunctions can be used to troubleshoot problems that occur during operation of the physical systems. Further, if dysfunctions can be predicted before they actually occur, operation of the physical system can be altered to prevent the dysfunction or otherwise mitigate the effects of the dysfunction on operation of the physical system. In turn, this can reduce wasted time, e.g. physical system down time, used to remedy the dysfunction. Further, this can reduce costs associated with remedying the dysfunction. However, as the complexity of a physical system increases, it becomes more difficult to accurately predict dysfunctions for the physical system. Specifically, as a physical system increases in complexity, the number of different dysfunctions that can occur in the physical system increases, thereby making it more difficult to accurately predict the different dysfunctions in the physical system. In turn, this can lead to deficiencies in the ability to accurately control the complex physical system based on predicted dysfunctions.

In the exploration and production of hydrocarbons, boreholes are drilled using complex drilling tools and systems. Further, in the exploration and production of hydrocarbons, various downhole tools are frequently lowered into a borehole, such as drilling assemblies, measurement tools, and production devices. Such downhole tools often include a number of components such as electronic equipment, sensors, or other modules used for various purposes. The drill tools/systems and the downhole tools/systems used in the exploration and production of hydrocarbons can be very complex, making it difficult to accurately predict dysfunctions in such systems. In turn, this can make it difficult to control such tools and systems based on the predicted dysfunctions.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2 illustrates a flowchart for an example method of predicting a dysfunction in a physical system using a dysfunction codex that includes a plurality of dysfunction models, in accordance with various aspects of the subject technology;

FIG. 3 illustrates a flowchart for an example method of generating dysfunction models of a dysfunction codex for predicting dysfunctions in physical systems, in accordance with various aspects of the subject technology;

DETAILED DESCRIPTION

Figure 1A:
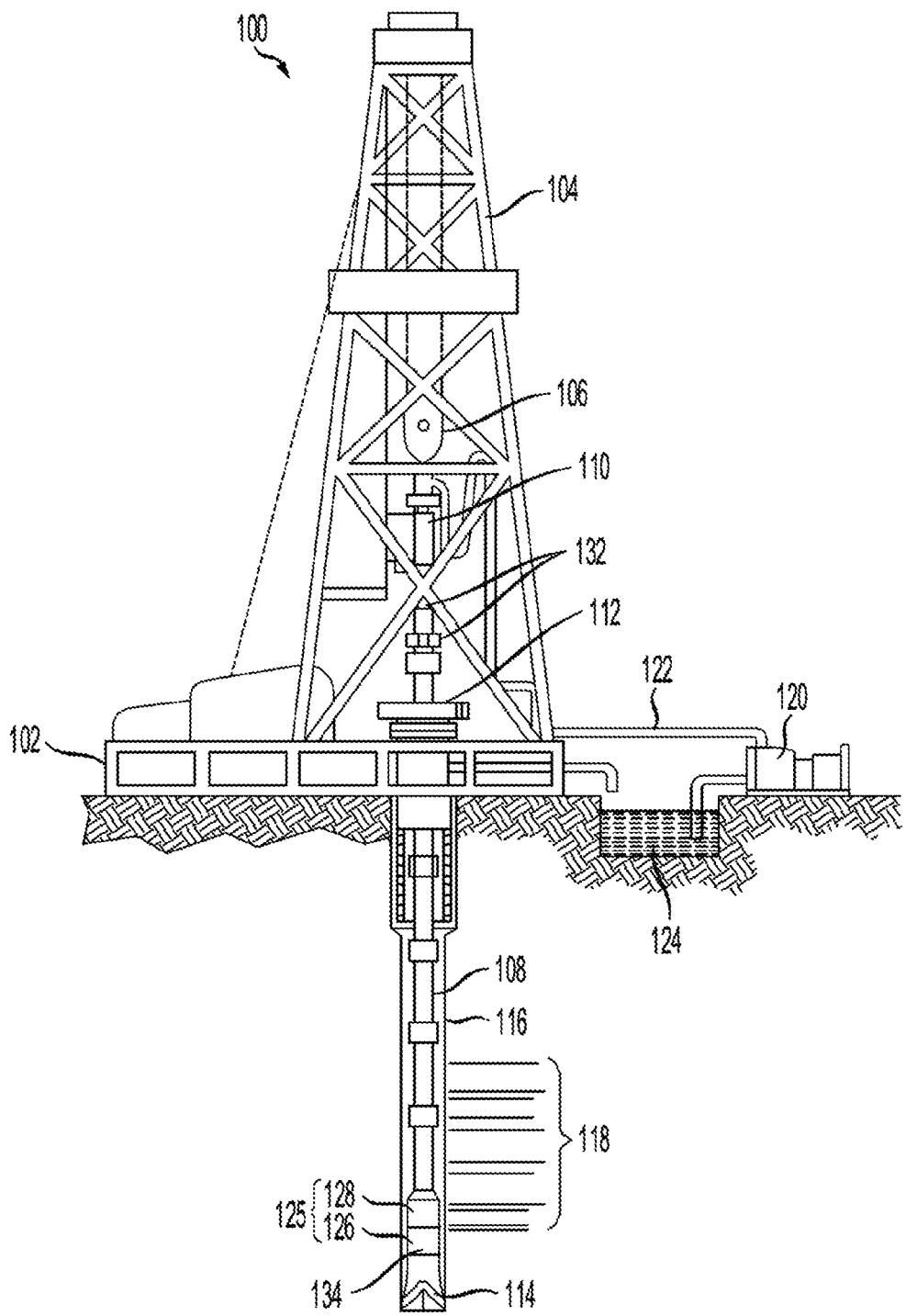
FIG. 1A is a schematic diagram of an example logging while drilling (LWD) wellbore operating environment, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Predicting dysfunctions in physical systems is advantageous for a number of reasons. Specifically, predicted dysfunctions can be used to troubleshoot problems that occur during operation of the physical systems. Further, if dysfunctions can be predicted before they actually occur, operation of the physical system can be altered to prevent the dysfunction or otherwise mitigate the effects of the dysfunction on operation of the physical system. In turn, this can reduce wasted time, e.g. physical system down time, used to remedy the dysfunction. Further, this can reduce costs associated with remedying the dysfunction. However, as the complexity of a physical system increases, it becomes more difficult to accurately predict dysfunctions for the physical system. Specifically, as a physical system increases in complexity, the number of different dysfunctions that can occur in the physical system increases, thereby making it more difficult to accurately predict the different dysfunctions in the physical system. In turn, this can lead to deficiencies in the ability to accurately control the complex physical system based on predicted dysfunctions.

In the exploration and production of hydrocarbons, boreholes are drilled using complex drilling tools and systems. Further, in the exploration and production of hydrocarbons, various downhole tools are frequently lowered into a borehole, such as drilling assemblies, measurement tools, and production devices. Such downhole tools often include a number of components such as electronic equipment, sensors, or other modules used for various purposes. The drill tools/systems and the downhole tools/systems used in the exploration and production of hydrocarbons can be very complex, making it difficult to accurately predict dysfunctions in such systems. In turn, this can make it difficult to control such tools and systems based on the predicted dysfunctions.

The disclosed technology addresses the foregoing by predicting dysfunctions in a physical system using a dysfunction codex that includes a plurality of dysfunction models for predicting the dysfunctions. Specifically, dysfunction model(s) can be selectively applied from the dysfunction codex to predict dysfunction(s) of the physical system. More specifically, dysfunction model(s) of the dysfunction codex can be selectively applied from the dysfunction codex based on context(s) associated with the physical system. As follows, the selected dysfunction model(s) can be applied to input system data of the physical system to predict the dysfunction(s) of the physical system.

In various embodiments, a dysfunction codex is provided that includes a plurality of dysfunction models for predicting one or more dysfunctions in a physical system based on one or more specific contexts of the physical system. The dysfunction codex can be applied to input system data of the physical system to predict a dysfunction of the physical system. Specifically, a dysfunction model of the plurality of dysfunction models within the dysfunction codex can be selected based on the one or more specific contexts of the physical system. As follows, the dysfunction model selected based on the one or more specific contexts of the physical system can be applied to the input system data of the physical system to predict the dysfunction of the physical system.

In various embodiments, A system can include one or more processors and at least one computer-readable storage medium storing instructions which, when executed by the one or more processors, cause the one or more processors to gather system data of one or more physical systems to generate a dysfunction codex including a plurality of dysfunction models for predicting a dysfunction in a physical system. The instructions can also cause the one or more processors to cluster system data into system data clusters using unsupervised learning. Further, the instructions can cause the one or more processors to identify signatures associated with the system data clusters using unsupervised learning. The instructions can cause the one or more processors to generate the plurality of dysfunction models within the dysfunction codex by performing supervised learning using the system data clusters and the signatures associated with the system data clusters. In turn, a dysfunction model of the plurality of dysfunction models can be selected based on one or more specific contexts of the physical system to predict the dysfunction in the physical system.

In various embodiments, a system can include a non-transitory computer-readable storage medium having stored therein instructions which, when executed by a processor, cause the processor to provide a dysfunction codex including a plurality of dysfunction models for predicting one or more dysfunctions in a physical system based on one or more specific contexts of the physical system. The instructions can also cause the processor to apply the dysfunction codex to input system data of the physical system to predict a dysfunction of the physical system. Specifically, the instructions can cause the processor to select a dysfunction model of the plurality of dysfunction models within the dysfunction codex to apply based on the one or more specific contexts of the physical system. Further, the instructions can cause the processor to predict the dysfunction of the physical system by applying the dysfunction model selected based on the one or more specific contexts of the physical system to the input system data of the physical system.

Turning now to FIG. 1A, a drilling arrangement is shown that exemplifies a Logging While Drilling (commonly abbreviated as LWD) configuration in a wellbore drilling scenario 100. Logging-While-Drilling typically incorporates sensors that acquire formation data. The drilling arrangement of FIG. 1A also exemplifies what is referred to as Measurement While Drilling (commonly abbreviated as MWD) which utilizes sensors to acquire data from which the wellbore's path and position in three-dimensional space can be determined. FIG. 1A shows a drilling platform 102 equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, it creates a wellbore 116 that passes through various subterranean formations 118. A pump 120 circulates drilling fluid through a supply pipe 122 to top drive 110, down through the interior of drill string 108 and out orifices in drill bit 114 into the wellbore. The drilling fluid returns to the surface via the annulus around drill string 108, and into a retention pit 124. The drilling fluid transports cuttings from the wellbore 116 into the retention pit 124 and the drilling fluid's presence in the annulus aids in maintaining the integrity of the wellbore 116. Various materials can be used for drilling fluid, including oil-based fluids and water-based fluids.

Logging tools 126 can be integrated into the bottom-hole assembly 125 near the drill bit 114. As the drill bit 114 extends the wellbore 116 through the formations 118, logging tools 126 collect measurements relating to various formation properties as well as the orientation of the tool and various other drilling conditions. The bottom-hole assembly 125 may also include a telemetry sub 128 to transfer measurement data to a surface receiver 132 and to receive commands from the surface. In at least some cases, the telemetry sub 128 communicates with a surface receiver 132 using mud pulse telemetry. In some instances, the telemetry sub 128 does not communicate with the surface, but rather stores logging data for later retrieval at the surface when the logging assembly is recovered.

Each of the logging tools 126 may include one or more tool components spaced apart from each other and communicatively coupled by one or more wires and/or other communication arrangement. The logging tools 126 may also include one or more computing devices communicatively coupled with one or more of the tool components. The one or more computing devices may be configured to control or monitor a performance of the tool, process logging data, and/or carry out one or more aspects of the methods and processes of the present disclosure.

In at least some instances, one or more of the logging tools 126 may communicate with a surface receiver 132 by a wire, such as wired drill pipe. In other cases, the one or more of the logging tools 126 may communicate with a surface receiver 132 by wireless signal transmission. In at least some cases, one or more of the logging tools 126 may receive electrical power from a wire that extends to the surface, including wires extending through a wired drill pipe.

Collar 134 is a frequent component of a drill string 108 and generally resembles a very thick-walled cylindrical pipe, typically with threaded ends and a hollow core for the conveyance of drilling fluid. Multiple collars 134 can be included in the drill string 108 and are constructed and intended to be heavy to apply weight on the drill bit 114 to assist the drilling process. Because of the thickness of the collar's wall, pocket-type cutouts or other type recesses can be provided into the collar's wall without negatively impacting the integrity (strength, rigidity and the like) of the collar as a component of the drill string 108.

Figure 1B:
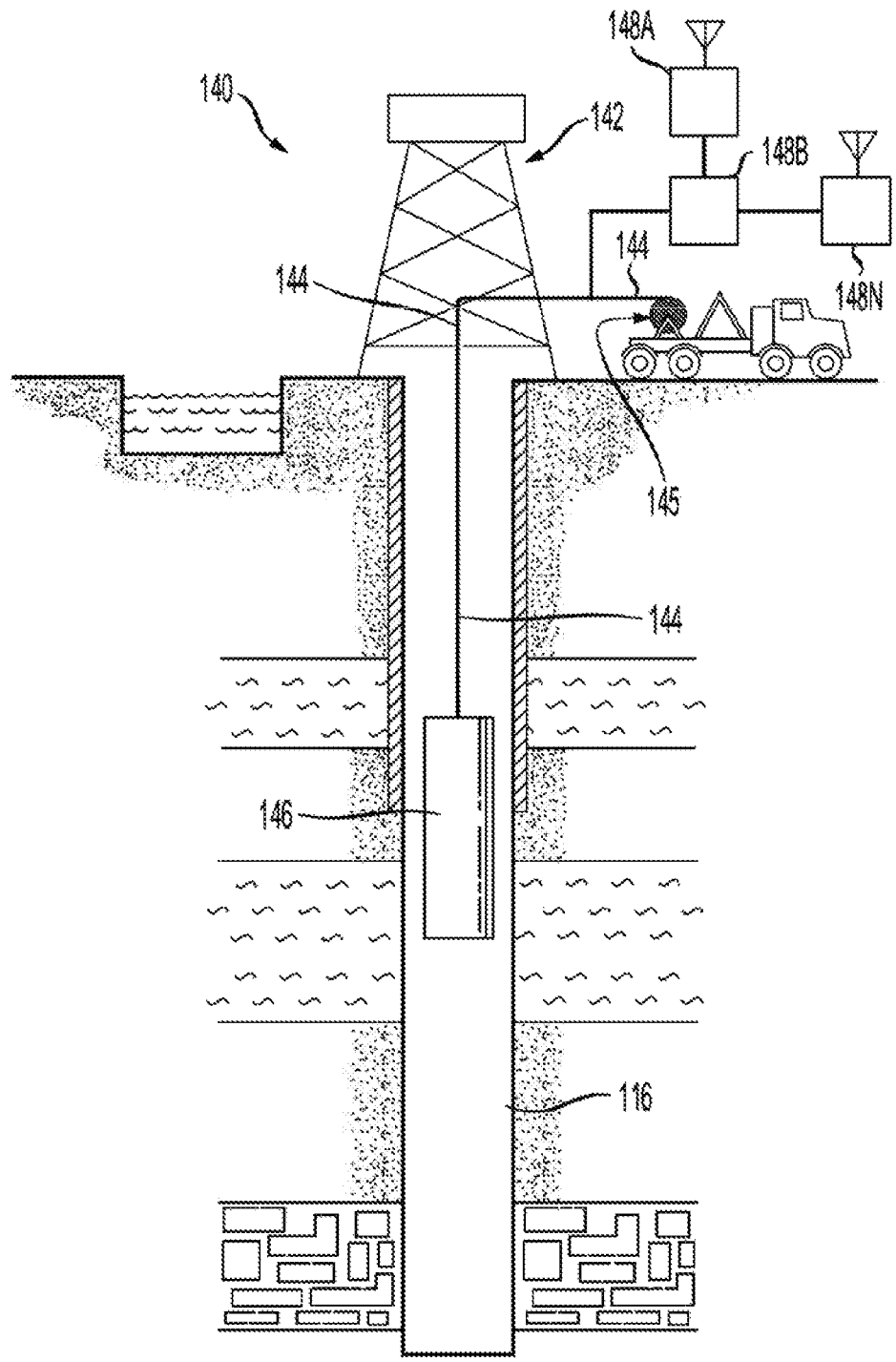
FIG. 1B is a schematic diagram of an example downhole environment having tubulars, in accordance with various aspects of the subject technology.

Referring to FIG. 1B, an example system 140 is depicted for conducting downhole measurements after at least a portion of a wellbore has been drilled and the drill string removed from the well. A downhole tool is shown having a tool body 146 in order to carry out logging and/or other operations. For example, instead of using the drill string 108 of FIG. 1A to lower tool body 146, which can contain sensors and/or other instrumentation for detecting and logging nearby characteristics and conditions of the wellbore 116 and surrounding formations, a wireline conveyance 144 can be used. The tool body 146 can be lowered into the wellbore 116 by wireline conveyance 144. The wireline conveyance 144 can be anchored in the drill rig 142 or by a portable means such as a truck 145. The wireline conveyance 144 can include one or more wires, slicklines, cables, and/or the like, as well as tubular conveyances such as coiled tubing, joint tubing, or other tubulars.

The illustrated wireline conveyance 144 provides power and support for the tool, as well as enabling communication between data processors 148A-N on the surface. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more of the processors 148A-N, which can include local and/or remote processors. Moreover, power can be supplied via the wireline conveyance 144 to meet power requirements of the tool. For slickline or coiled tubing configurations, power can be supplied downhole with a battery or via a downhole generator.

FIG. 2 illustrates a flowchart for an example method of predicting a dysfunction in a physical system using a dysfunction codex that includes a plurality of dysfunction models. The method shown in FIG. 2 is provided by way of example, as there are a variety of ways to carry out the method. Additionally, while the example method is illustrated with a particular order of steps, those of ordinary skill in the art will appreciate that FIG. 2 and the modules shown therein can be executed in any order and can include fewer or more modules than illustrated. Each module shown in FIG. 2 represents one or more steps, processes, methods or routines in the method.

At step 200, a dysfunction codex for predicting one or more dysfunctions in a physical system is provided. A physical system, as used herein, can include applicable apparatuses, tools, and physical frameworks in which operations occur. For example, a physical system can include either or both drilling tools and a wellbore in a drilling environment. The dysfunction codex can include a plurality of dysfunction models for predicting one or more dysfunctions in a physical system. As will be discussed in greater detail later, the dysfunction models included as part of the dysfunction codex can be trained using both unsupervised learning and supervised learning.

A dysfunction model can map one or more operational characteristics of one or more physical systems to one or more dysfunctions. For example, a dysfunction model can map one or more operational characteristics of a wellbore to a dysfunction of well influx. Operational characteristics, as used herein, can include applicable characteristics of a physical system during operation of the physical system. For example, operational characteristics of a drilling system can include a system type, electrical loading, mechanical stresses, e.g. acceleration, force and momentum, and surface and downhole process measurements, e.g. torque, flow, revolutions per minute (RPM), and gamma levels, of the drilling system. Further in the example, operational characteristics of the drilling system can include that the system functions as a drilling system to drill a hole, e.g. to drill a wellbore. Operational characteristics can include both static characteristics that do not change during operation of a physical system and dynamic characteristics that do change during operation of the physical system. For example, operational characteristics can include changing torque levels, flow levels, RPMs, and gamma levels of a drilling system. Further, operational characteristics of a physical system can include both observed operational characteristics and derived operational characteristics of the physical system. Derived operational characteristics of a physical system can include operational characteristics that are either or both calculated and inferred from observed/measured operational characteristics of the physical system.

Further, a dysfunction model can map one or more environmental characteristics of one or more physical systems to one or more dysfunctions. Environmental characteristics, as used herein, include applicable characteristics of an environment of a physical system, e.g. during operation of the physical system. For example, environmental characteristics of a drilling system can include lithology and geothermal conditions of a rock formation that the drilling system is/will be drilling. In yet another example, a dysfunction model can map environmental characteristics of a wellbore to a dysfunction of a certain percentage of lost circulation in the wellbore at a specific depth and/or time.

The dysfunction codex, e.g. one or more dysfunction models in the dysfunction codex, can predict a probability of a dysfunction occurring in a physical system, e.g. during operation of the physical system. Specifically, the dysfunction codex can predict a numerical probability of a dysfunction occurring in a physical system. For example, the dysfunction codex can predict that there is a 75% chance that a drilling system will experience a twist-off during operation of the drilling system.

Two or more dysfunction models in the dysfunction codex can be related dysfunction models. For example, the dysfunction models can be related by predicting the same dysfunction for a physical system. Further, two or more dysfunction models in the dysfunction codex can be related multivariate dysfunction models. Related multivariate dysfunction models can include models that map different values of the same characteristic, e.g. operational and/or environmental characteristic, to one or more dysfunctions. For example, multivariate dysfunction models can map different RPMs of drilling systems to a dysfunction of twist-off. Further, related multivariate dysfunction models can include models that map different values of different characteristics, e.g. operational and environmental characteristics, to one or more dysfunctions. For example multivariate dysfunction models can map different vibrational values and different environmental temperatures of drilling system to a dysfunction of mechanical failure of a drilling system.

At step 202, input system data of the physical system is received for predicting a dysfunction in a physical system. System data/input system data of a physical system can include applicable data related to the physical system for predicting one or more dysfunctions in the physical system. System data of a physical system can include operational data of operational characteristics of the physical system. Operational data of a physical system can include observed operational data of observed operational characteristics of the physical system. For example, operational data/observed operational data can include a measured torque of a drill. Further, operational data of a physical system can include derived operational data of derived operational characteristics of the physical system. For example, operational data/derived operational data of a drilling system can include a rate of change of a parameter associated with the drilling system, a derived core pressure associated with the drilling system, and calculated fracture data associated with the drilling system. Further, system data of a physical system can include environmental data of environmental characteristics of the physical system. For example, system data can include environmental temperatures at a drilling system.

System data of a physical system can include either or both static and dynamic system data. Specifically, system data of a physical system can include operational data of either or both static and dynamic operational characteristics of the physical system. Further, system data of a physical system can include environmental data of either or both static and dynamic environmental characteristics of the physical system.

At step 204, a dysfunction model of the plurality of dysfunction models of the dysfunction codex is selected for application in predicting one or more dysfunctions of the physical system. In selecting dysfunction models from the dysfunction codex for application in predicting one or more dysfunctions, the selected dysfunction models can be selectively exposed from within the dysfunction codex, e.g. using an application program interface. Specifically, the dysfunction model can be selected from the plurality of dysfunction models without actually applying every dysfunction model in the dysfunction codex. This is advantageous as it reduces the total amount of time used in applying the dysfunction codex to predict one or more dysfunctions in the physical system, e.g. when compared to a technique that applies multiple or all dysfunction models in the dysfunction codex without selecting the applied dysfunction models. Further, this is advantageous as it reduces the total amount of computational resources used in actually applying the dysfunction codex to predict one or more dysfunctions in the physical system, e.g. when compared to a technique that applies multiple or all dysfunction models in the dysfunction codex without selecting the applied dysfunction models.

The dysfunction model can be selected from the plurality of dysfunction models of the dysfunction codex based on one or more specific contexts of the physical system. A context of a physical system can include applicable characteristics of the physical system related to operation of the physical system. Specifically, a context of a physical system can include operational characteristics, both static and dynamic operational characteristics, of the physical system. More specifically, a context of a physical system can include observed operational characteristics of the physical system, as well as derived operational characteristics of the physical system. For example, a dysfunction model for predicting dysfunction based on electrical loading on a drilling system can be selected for a drilling system based on measured electrical loading on the drilling system. In another example, a dysfunction model for predicting dysfunction in a specific type of drilling system can be selected for a physical system that is the specific type of drilling system. Further, a context of a physical system can include environmental characteristics, both static and dynamic environmental characteristics, of the physical system. For example, a dysfunction model can be selected for a drilling system based on environmental humidity levels at the drilling system.

Additionally, the dysfunction model can be selected based on metadata associated with the dysfunction model, e.g. metadata associated with generating the dysfunction model. Specifically and as will be discussed in greater detail later, the dysfunction models in the dysfunction codex can be tagged with metadata describing the dysfunction models. In turn, the dysfunction models can be selected from the dysfunction codex based on one or more contexts of the physical system using the metadata of the dysfunction models. Metadata of the dysfunction models can include applicable data describing the dysfunction models. Specifically, metadata of the dysfunction models can include an identification of one or more dysfunctions capable of being predicted by each of the dysfunction models. Further, metadata of the dysfunction models can include operational characteristics of one or more physical systems used to train each of the dysfunction models. Additionally, metadata of the dysfunction models can include environmental characteristics of one or more physical systems used to train each of the dysfunction models.

The dysfunction model can be selected for the physical system based on a confidence score assigned to the dysfunction model. Specifically, confidence scores for predicting one or more dysfunctions in the physical system can be assigned to all or a subset of the dysfunction models in the dysfunction codex. In turn, the dysfunction model can be selected based on the confidence score assigned to it, e.g. when compared to the confidence scores assigned to the other dysfunction models in the dysfunction codex. A confidence score can include an indicator, a numerical indicator, of a likelihood that a dysfunction model will accurately predict a dysfunction, e.g. a relevant dysfunction, in a physical system. For example, a confidence score can indicate there is a 90% chance a dysfunction model will accurately predict a twist-off for a drilling system. In turn, the dysfunction model can be selected based on the confidence score of a 90% chance that the dysfunction model will accurately predict the twist-off for the drilling system.

A confidence score can be generated based on the input system data of the physical system. For example, operational characteristics of a drilling system can be used to assign confidence scores to one or more dysfunction models from the dysfunction codex for predicting one or more dysfunctions in the drilling system based on the operational characteristics. Further, a confidence score can be generated based on the input system data and the metadata for the dysfunction models. For example, the metadata and the input system data can be used to verify that a dysfunction model can actually predict a dysfunction that is relevant to the physical system, e.g. as indicated by a generated confidence score for the dysfunction model.

Confidence scores can be assigned to the dysfunction models of the dysfunction codex in real-time during operation of the physical system. Specifically, system data can be generated and received for the physical system in real-time during operation of the physical system. In turn, confidence scores for the dysfunction models can be updated/generated in real-time. As follows, dysfunction models in the dysfunction codex can be selected for the physical system using the confidence scores generated/updated in real-time based on the real-time system data of the physical system.

At step 206, the dysfunction of the physical system is predicted using the dysfunction model. Specifically, the dysfunction can be predicted by applying the input system data of the physical system to the dysfunction model. More specifically, the dysfunction model can be applied to the input system data to predict a 95% likelihood that the dysfunction will occur in the physical system. For example, the dysfunction model can be applied to input system data of a wellbore to predict a 95% likelihood that the wellbore will experience a certain percentage of lost circulation during operation at a specific depth and/or time. As will be discussed in greater detail later, the physical system can be controlled based on the predicted dysfunction. Specifically, actionable output, e.g. actionable alerts, can be provided to an operator of the physical system based on the predicted dysfunction. In turn, the operator can control the physical system using the actionable output.

The method shown in FIG. 2 can be implemented in an applicable physical system for predicting dysfunctions in the physical system. Specifically, the method shown in FIG. 2 can be implemented in the example wellbore drilling scenario 100 shown in FIG. 1A or the example system 140 shown in FIG. 1B. More specifically, the method shown in FIG. 2 can be used in a drilling system configured to construct a well or the actual well itself created by the drilling system. In turn, the method can be used to predict dysfunctions during a well design phase of the drilling system. an actual well construction phase of the drilling system, and an actual operation phase of the well.

The dysfunction codex can be applied according to the example method shown in FIG. 2 as a black box. Specifically, the dysfunction codex can be fed the input system data and the dysfunction model can be selected and exposed without the knowledge of the physical system, e.g. an operator of the physical system. Subsequently, the dysfunction model can be applied to the input system data to output the predicted dysfunction, which can then be presented/used to control operation of the physical system, e.g. through an actionable alert presented to the operator.

FIG. 3 illustrates a flowchart for an example method of generating dysfunction models of a dysfunction codex for predicting dysfunctions in physical systems. The method shown in FIG. 3 is provided by way of example, as there are a variety of ways to carry out the method. Additionally, while the example method is illustrated with a particular order of steps, those of ordinary skill in the art will appreciate that FIG. 3 and the modules shown therein can be executed in an applicable different order and can include fewer or more modules than illustrated. Each module shown in FIG. 3 represents one or more steps, processes, methods or routines in the method.

At step 300, system data is received from one or more physical systems for training dysfunction models of a dysfunction codex. The system data can include applicable system data. Specifically, the system data can include operational data, e.g. both observed operational data and derived operational data. Additionally, the system data can include environmental data of a physical system. The one or more physical systems can include a plurality of different types of physical systems. For example, the physical systems can include different drilling systems.

At step 302, the system data is clustered into system data clusters using unsupervised learning. An applicable unsupervised learning technique can be utilized to cluster the system data into system data clusters. Specifically, an applicable data science technique for behavior cluster analysis or binary relationship analysis technique can be utilized to cluster the system data into system data clusters. In various embodiments, the same system data can be grouped into multiple and different system data clusters.

At step 304, data signatures associated with the system data clusters can be identified using unsupervised learning. Specifically, raw curve signatures for the system data clusters can be identified using unsupervised learning. An applicable unsupervised learning technique can be utilized to identify data signatures of the system data clusters. Specifically, an applicable data science technique for behavior cluster analysis or binary relationship analysis technique can be utilized to identify data signatures of the system data clusters.

In grouping the system data into system data clusters and identifying signatures associated with the system data clusters at steps 302 and 304, metadata can be created. Specifically, metadata about what the clusters include and what the signatures represent, e.g. clustered operational and environmental characteristics of the physical systems, can be generated. In turn, the metadata about the clusters and the signatures can be included in metadata associated with generating the dysfunction models. As will be discussed in greater detail later, the dysfunction models can be tagged with the metadata about the clusters and signatures as part of tagging the dysfunction models with metadata associated with generating the dysfunction models. As discussed previously, the metadata can be used to select a dysfunction model of the dysfunction models from the dysfunction codex based on one or more contexts of a physical system.

At step 306, supervised learning is performed using supervised input states, the system data clusters, and/or the signatures associated with the system data clusters to train the dysfunction models. An applicable supervised learning technique can be applied to the system data clusters and/or the signatures to train the dysfunction models. Specifically, deep learning can be performed on the supervised input states versus different combinations of the system data clusters and the associated signatures to train the dysfunction models. More specifically, combinations of operational characteristics and environmental characteristics included in the system data clusters, and associated data signatures, can be mapped to dysfunctions in the dysfunction models to predict dysfunctions in physical systems.

The supervised input states can include known characteristic states of physical systems when specific dysfunctions occur in the physical system. Specifically, the supervised input states can include known operational characteristic states and environmental characteristics states of a physical system when a specific dysfunction occurs, or is expected to occur, in the physical system. For example, a supervised input state can specify that twist-off occurs in a drilling system when the drilling system is operating at a specific RPM, at a specific depth, and at a specific temperature. The supervised input states can be pre-defined. Further, the supervised input states can be identified from past operations of physical systems.

In training the dysfunction models through supervised learning, metadata can be created. Specifically, metadata can be generated that identifies the specific dysfunctions mapped to physical system characteristics through the dysfunction models. In turn, this metadata can be included in metadata associated with generating the dysfunction models. Specifically, the metadata generated by training the models through supervised learning can be grouped with the metadata created through clustering and signature identification at steps 302 and 304. More specifically, the metadata can be grouped with metadata describing environmental characteristics and operational characteristics of the physical systems used in training the dysfunctions models, e.g. as part of the received system data. Each of the dysfunction models in the dysfunction codex can then be tagged with the corresponding metadata associated with generating the dysfunction models, e.g. data about the operational characteristics and the environmental characteristics of the physical systems. For example, a first dysfunction model can be tagged with metadata created through training of the first dysfunction model and the second dysfunction model can be tagged with metadata created through training of the second dysfunction model. As discussed previously, this metadata can be used to select the dysfunction models based on one or more contexts of a physical system for purposes of predicting one or more dysfunctions in the physical system.

The unsupervised learning can be performed, at steps 302 and 304, before supervised learning is performed, at step 306, to generate two or more related multivariate dysfunction models for one or more specific dysfunctions. Specifically, performing unsupervised learning to cluster the system data before performing supervised learning can allow for the creation of dysfunction models that are multivariate. As a simplified example, unsupervised learning can be used to form two different system data clusters that form different variations of a dysfunction model, effectively forming two dysfunction models. For example, a stuck pipe model can be created that has multiple variations of different operational and environmental characteristics that can predict a stuck pipe, effectively forming multiple dysfunction models for predicting a stuck pipe.

Figure 4:
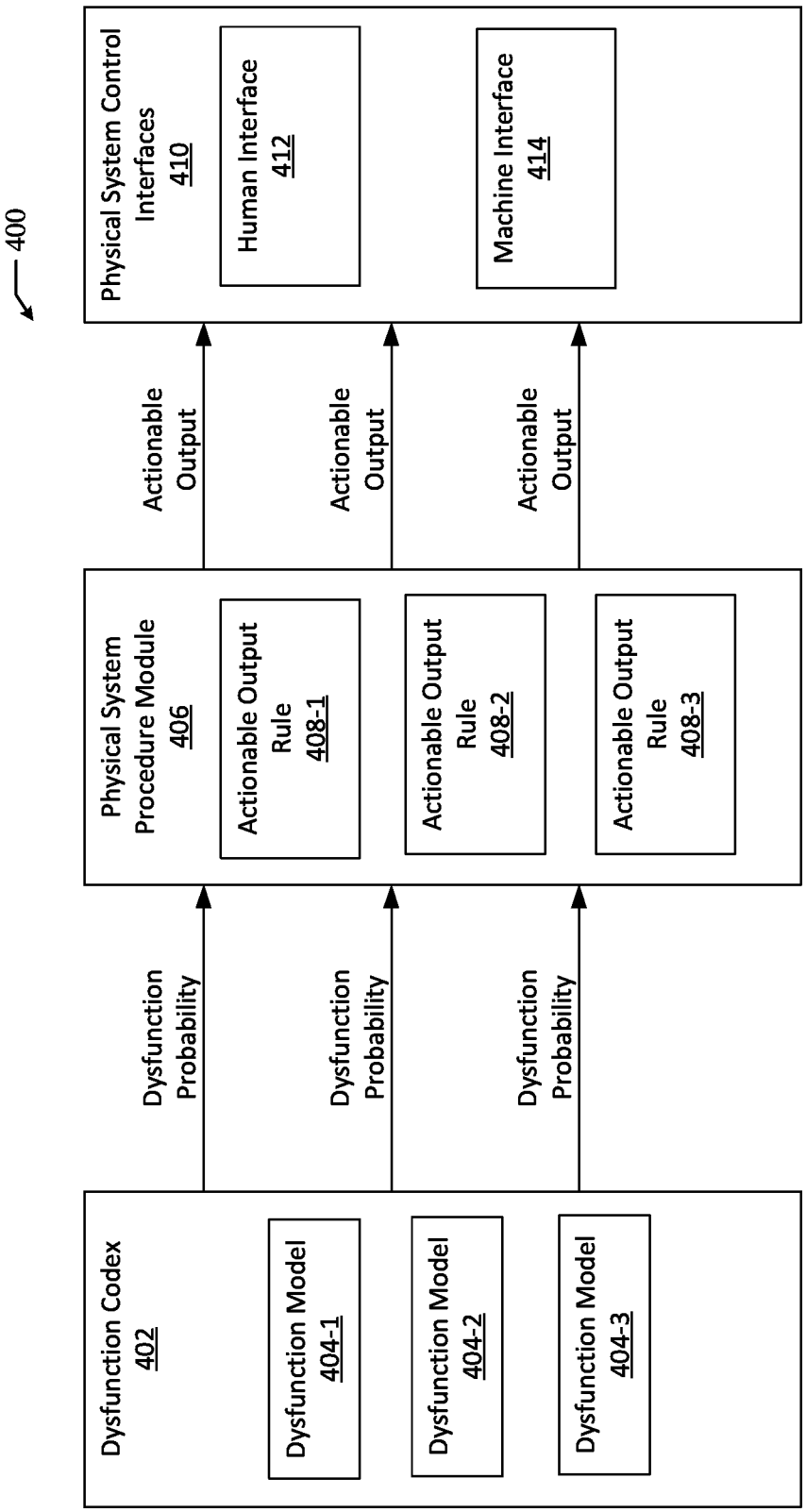
FIG. 4 depicts a system for controlling a physical system based on predicted dysfunctions of the physical system.

FIG. 4 depicts a system 400 for controlling a physical system based on predicted dysfunctions of the physical system. The example system 400 includes a dysfunction codex 402. The dysfunction codex 402 can be applied according to an applicable method for predicting dysfunctions in a physical system, such as the example method shown in FIG. 2. Further, the dysfunction codex 402 can be built and maintained according to an applicable method for building and maintaining a dysfunction codex, such as the example method shown in FIG. 3. The dysfunction codex 402 includes a plurality of dysfunction models 404-1, 404-2, and 404-3 ("dysfunction models 404") configured to predict dysfunction probabilities of one or more dysfunctions in a physical system.

The system 400 also includes a physical system procedure module 406. The physical system procedure module 406 functions to generate and provide actionable output for controlling the physical system based on predicted dysfunction probabilities. Specifically, the physical system procedure module 406 can generate actionable output that includes one or a combination of procedural actions, multi-parameter set points, and limits for controlling operation of a physical system. Actionable output can include actionable alerts that are presentable to an operator of the physical system for controlling the physical system. Actionable output can also include instructions that are executable by components of the physical system to autonomously control the physical system. The physical system procedure module 406 can provide actionable output in an applicable format, e.g. based on a recipient of the actionable output. For example, the physical system procedure module 406 can provide actionable output in an industry standard machine readable protocol, such as OPC Unified Architecture ("OPC UA") or wellsite information transfer standard markup language ("WITSML"). In turn, components of a physical system can read the actionable output in the machine readable protocol and control the physical system based on the actionable output.

The physical system procedure module 406 can identify actionable output based on actionable rules 408-1, 408-2, and 408-3 ("actionable output rules 408"). The actionable output rules 408 can specify actions to take for controlling a physical system based on predicted probabilities of dysfunctions. Specifically, the actionable output rules 408 can specify actions to take for controlling a physical system based on a predicted probability of a dysfunction in relation to a probability threshold, e.g. pre-defined probability threshold, for the dysfunction. For example, an actionable output rule can specify that if there is a greater than 70% chance of a twist-off, then provide an instruction, e.g. actionable output, to reduce system RPM by 10%. Actionable output rules can specify different actionable outputs based on different probability levels for a dysfunction. For example, actionable output rules can specify reducing system RPM by increasing amounts as the probability of a twist-off in a drilling system increases. Further, an actionable output rule can specify actions to take for controlling a physical system based on multiple dysfunctions. For example, an actionable output rule can specify that if a probability of a twist-off is 75% and a probability of a vibration dysfunction is 70%, then provide an actionable alert informing a drilling engineer to come off bottom while circulating with a specified bottom hole pressure.

In the example system 400 shown in FIG. 4, the physical system procedure module 406 receives a plurality of dysfunction probability predictions from the dysfunction codex 402. In turn, the physical system procedure module 406 generates a plurality of actionable outputs based on the dysfunction probability predictions received from the dysfunction codex 402. Specifically, the physical system procedure module 406 can apply the actionable output rules 408 to generate the actionable outputs based on the dysfunction probability predictions.

The example system 400 shown in FIG. 4 includes physical system control interfaces 410. The physical system control interfaces 410 include a human interface 412 and a machine interface 414. The human interface 412 functions to provide actionable output to a human associated with a physical system in a manner that is perceivable by the human. For example, the human interface 412 can include a display for presenting actionable alerts to an operator of a drilling system. The machine interface 414 functions to provide actionable output to components of a physical system in a manner that is readable/executable by the components. For example, the machine interface 414 can provide actionable outputs in a machine readable format, e.g. as executable instructions, to a processor component of a physical system. In the example system 400 shown in FIG. 4, the physical system control interfaces 410 receive the actionable outputs from the physical system procedure module 406. In turn, the human interface 412 and the machine interface 414 can provide the actionable outputs received from the physical system procedure module 406 to a human associated with a physical system and/or components of the physical system.

Figure 5:
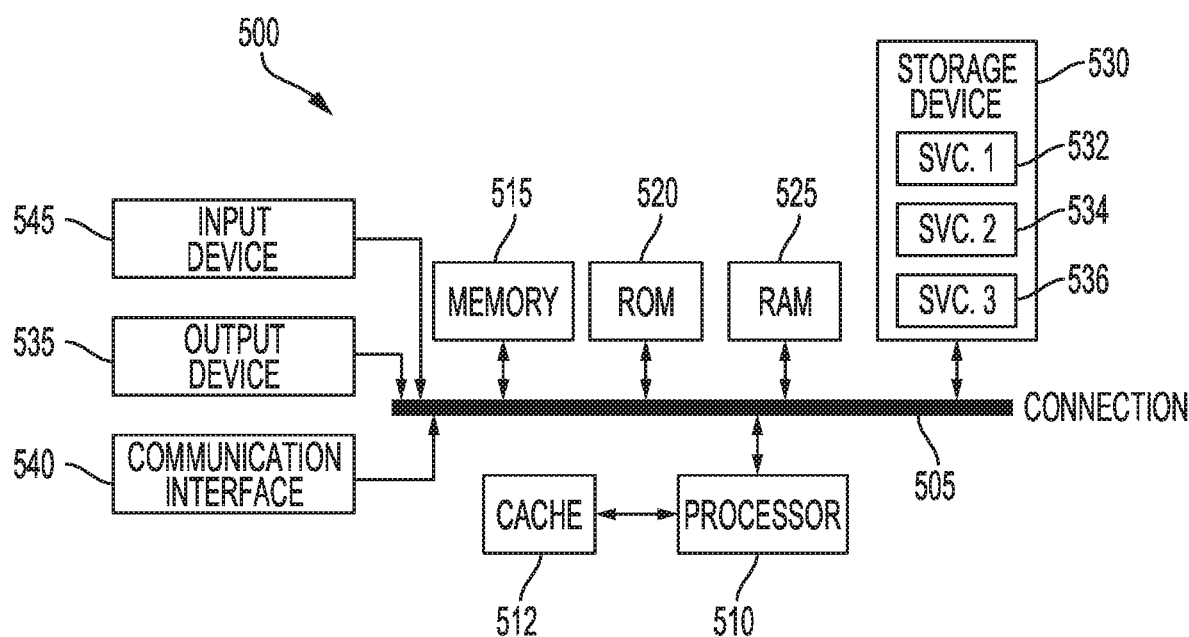
FIG. 5 illustrates an example computing device architecture which can be employed to perform various steps, methods, and techniques disclosed herein.

FIG. 5 illustrates an example computing device architecture 500 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 5 illustrates an example computing device architecture 500 of a computing device which can implement the various technologies and techniques described herein. For example, the computing device architecture 500 can implement the methods shown in FIGS. 2 and 3 and the system 400 shown in FIG. 4 and perform various steps, methods, and techniques disclosed herein. The components of the computing device architecture 500 are shown in electrical communication with each other using a connection 505, such as a bus. The example computing device architecture 500 includes a processing unit (CPU or processor) 510 and a computing device connection 505 that couples various computing device components including the computing device memory 515, such as read only memory (ROM) 520 and random access memory (RAM) 525, to the processor 510.

The computing device architecture 500 can include a cache of high-speed memory connected directly with, in close proximity to, or integrated as part of the processor 510. The computing device architecture 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other computing device memory 515 may be available for use as well. The memory 515 can include multiple different types of memory with different performance characteristics. The processor 510 can include any general purpose processor and a hardware or software service, such as service 1 532, service 2 534, and service 3 536 stored in storage device 530, configured to control the processor 510 as well as a special-purpose processor where software instructions are incorporated into the processor design. The processor 510 may be a self-contained system, containing multiple cores or processors, a bus, memory controller, cache, etc. A multi-core processor may be symmetric or asymmetric.

To enable user interaction with the computing device architecture 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art, such as a display, projector, television, speaker device, etc. In some instances, multimodal computing devices can enable a user to provide multiple types of input to communicate with the computing device architecture 500. The communications interface 540 can generally govern and manage the user input and computing device output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof. The storage device 530 can include services 532, 534, 536 for controlling the processor 510. Other hardware or software modules are contemplated. The storage device 530 can be connected to the computing device connection 505. In one aspect, a hardware module that performs a particular function can include the software component stored in a computer-readable medium in connection with the necessary hardware components, such as the processor 510, connection 505, output device 535, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal.

Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1. A method comprising providing a dysfunction codex including a plurality of dysfunction models for predicting one or more dysfunctions in a physical system based on one or more specific contexts of the physical system. The method can include applying the dysfunction codex to input system data of the physical system to predict a dysfunction of the physical system. Specifically, the method can include selecting a dysfunction model of the plurality of dysfunction models within the dysfunction codex to apply based on the one or more specific contexts of the physical system. The method can also include predicting the dysfunction of the physical system by applying the dysfunction model selected based on the one or more specific contexts of the physical system to the input system data of the physical system.

Statement 2. The method of statement 1, wherein at least two of the plurality of dysfunction models in the dysfunction codex are related multivariate dysfunction models for a single dysfunction and the dysfunction model is selected from the related multivariate dysfunction models based on the one or more specific contexts of the physical system.

Statement 3. The method of statements 1 and 2, further comprising performing unsupervised learning followed by supervised learning to system data of one or more physical systems to generate the plurality of dysfunction models within the dysfunction codex.

Statement 4. The method of statements 1 through 3, wherein unsupervised learning is performed before supervised learning is performed to generate the plurality of dysfunction models including two or more related multivariate dysfunction models for a single dysfunction.

Statement 5. The method of statements 1 through 4, wherein the system data of the one or more physical systems includes either or both operational data and environmental data of the one or more physical systems and further wherein the operational data of the one or more physical systems includes either or both observed operational data and derived operational data of the one or more physical systems.

Statement 6. The method of statements 1 through 5, further comprising clustering the system data of the one or more physical systems into system data clusters using unsupervised learning. Further, the method can include identifying signatures associated with the system data clusters using unsupervised learning. The method can also include generating the plurality of dysfunction models within the dysfunction codex by performing supervised learning using the system data clusters and the signatures associated with the system data clusters.

Statement 7. The method of statements 1 through 6, further comprising identifying supervised input states from characteristic states of the one or more physical systems at pre-defined dysfunctions. The method can also include performing supervised learning using the supervised input states, the system data clusters, and the signatures associated with the system data clusters to generate the plurality of dysfunction models.

Statement 8. The method of statements 1 through 7, further comprising tagging each of the plurality of dysfunction models within the dysfunction codex with corresponding metadata associated with generating each of the plurality of dysfunction models. The method can also include selecting the dysfunction model based on the one or more specific contexts of the physical system using the metadata associated with generating the dysfunction model.

Statement 9. The method of statements 1 through 8, wherein the metadata associated with generating each of the plurality of dysfunction models includes one or a combination of characteristics of a dysfunction capable of being predicted by each of the plurality of dysfunction models, operational characteristics of the one or more physical systems used to generate each of the plurality of dysfunction models, and environmental characteristics of the one or more physical systems used to generate each of the plurality of dysfunction models.

Statement 10. The method of statements 1 through 9, further comprising assigning a confidence score to the dysfunction model for predicting the dysfunction of the physical system, wherein the confidence score is assigned based on the input system data of the physical system. The method can also include selecting the dysfunction model from the plurality of dysfunction models within the dysfunction codex based on the confidence score assigned to the dysfunction model.

Statement 11. The method of statements 1 through 10, wherein the one or more specific contexts of the physical system are associated with the input system data and include one or a combination of static operational characteristics of the physical system, dynamic operational characteristics of the physical system, static environmental characteristics of the physical system, and dynamic environmental characteristics of the physical system.

Statement 12. The method of statements 1 through 11, wherein predicting the dysfunction of the physical system further includes predicting a probability of the dysfunction occurring within the physical system, the method further comprising determining whether an actionable output rule is met based on the probability of the dysfunction occurring, wherein the actionable output rule specifies one or more actionable outputs to provide for controlling the physical system. The method can also include providing the one or more actionable outputs for controlling the physical system if the actionable output rule is met based on the probability of the dysfunction occurring within the physical system.

Statement 13. The method of statements 1 through 12, wherein the actionable output rule includes a pre-defined probability threshold of the dysfunction for providing the one or more actionable outputs.

Statement 14. The method of statements 1 through 13, wherein the physical system is a drilling system and the dysfunction predicted by the dysfunction codex is a drilling dysfunction of the drilling system.

Statement 15. A system comprising one or more processors and at least one computer-readable storage medium having stored therein instructions. The instructions which, when executed by the one or more processors, cause the one or more processors to perform operations comprising gathering system data of one or more physical systems to generate a dysfunction codex including a plurality of dysfunction models for predicting a dysfunction in a physical system. Further, the instructions can cause the one or more processors to cluster the system data of the one or more physical systems into system data clusters using unsupervised learning. Additionally, the instructions can cause the one or more processors to identify signatures associated with the system data clusters using unsupervised learning. The instructions can also cause the one or more processors to generate the plurality of dysfunction models within the dysfunction codex by performing supervised learning using the system data clusters and the signatures associated with the system data clusters, wherein a dysfunction model of the plurality of dysfunction models is selectable based on one or more specific contexts of the physical system to predict the dysfunction in the physical system.

Statement 16. The system of statement 15, wherein the instructions which, when executed by the one or more processors, further cause the one or more processors to perform operations comprising identifying supervised input states from characteristic states of the one or more physical systems at pre-defined dysfunctions. Further, the instructions can cause the one or more processors to perform supervised learning using the supervised input states, the system data clusters, and the signatures associated with the system data clusters to generate the plurality of dysfunction models.

Statement 17. The system of statements 15 and 16, wherein the instructions which, when executed by the one or more processors, further cause the one or more processors to perform operations comprising tagging each of the plurality of dysfunction models within the dysfunction codex with corresponding metadata associated with generating each of the plurality of dysfunction models, wherein the dysfunction model is selected from the plurality of dysfunction models based on the one or more specific contexts of the physical system using the metadata associated with generating the dysfunction model.

Statement 18. The method of statements 15 through 17, wherein the metadata associated with generating each of the plurality of dysfunction models includes one or a combination of characteristics of a dysfunction capable of being predicted by each of the plurality of dysfunction models, operational characteristics of the one or more physical systems used to generate each of the plurality of dysfunction models, and environmental characteristics of the one or more physical systems used to generate each of the plurality of dysfunction models.

Statement 19. The method of statements 15 through 18, wherein the one or more specific contexts of the physical system include one or a combination of static operational characteristics of the physical system, dynamic operational characteristics of the physical system, static environmental characteristics of the physical system, and dynamic environmental characteristics of the physical system.

Statement 20. A non-transitory computer-readable storage medium having stored therein instructions which, when executed by a processor, cause the processor to perform operations comprising providing a dysfunction codex including a plurality of dysfunction models for predicting one or more dysfunctions in a physical system based on one or more specific contexts of the physical system. The instructions can cause the processor to apply the dysfunction codex to input system data of the physical system to predict a dysfunction of the physical system. Further, the instructions can cause the processor to select a dysfunction model of the plurality of dysfunction models within the dysfunction codex to apply based on the one or more specific contexts of the physical system. The instructions can also cause the processor to predict the dysfunction of the physical system by applying the dysfunction model selected based on the one or more specific contexts of the physical system to the input system data of the physical system.

What is claimed is:

1. A method comprising:
    generating a plurality of system data clusters from operational data associated with one or more drilling systems of a type of drilling system;
    identifying one or more specific contexts of the type of drilling system, wherein the one or more specific contexts identify the type of drilling system and a plurality of dynamic operational characteristics;
    generating a plurality of signatures based on the plurality of system data clusters;
    providing a plurality of dysfunction models for predicting one or more dysfunctions in a drilling system of the one or more drilling systems based on the one or more specific contexts of the type of drilling system, wherein the one or more specific contexts are associated with the operational data;
    generating a first metadata tag associated with a first dysfunction that:
        identifies the type of drilling system, and
        includes a first signature of the plurality of signatures, wherein the first signature represents a first dynamic operational characteristic of the plurality of dynamic operational characteristics;
    generating a second metadata tag associated with a second dysfunction that:
        identifies the type of drilling system, and
        includes a second signature of the plurality of signatures, wherein the second signature represents a second dynamic operational characteristic of the plurality of dynamic operational characteristics;
    tagging the plurality of dysfunction models for predicting the one or more dysfunctions with respective metadata tags that each include at least one of the plurality of signatures, the respective metadata tags associated with the one or more specific contexts of the type of drilling system and including the first metadata tag associated with the first dysfunction and the second metadata tag associated with the second dysfunction, wherein:
        the first metadata tag is assigned to at least two related multivariate dysfunction models of the plurality of dysfunction models, and
        one or more other dysfunction models of the plurality of dysfunction models are tagged with the second metadata tag associated with the second dysfunction;
    selecting a dysfunction model of the at least two related multivariate dysfunction models based on the type of drilling system and the first metadata tag; and
    predicting the first dysfunction of the drilling system by applying the selected dysfunction model, wherein:
        the selected dysfunction model is applied to predict the first dysfunction while refraining from applying the one or more other dysfunction models that are tagged with the second metadata tag associated with the second dysfunction, and
        operation of the drilling system is updated to change the first dynamic operational characteristic based on the prediction of the first dysfunction of the type of drilling system, wherein the change to the first dynamic operational characteristic results in a change to at least one of a flow level, a torque level, or a number of revolutions per minute (RPM) of the drilling system.

2. The method of claim 1, further comprising:
    performing unsupervised learning followed by supervised learning to generate the plurality of dysfunction models from acquired system data of the one or more drilling systems.

3. The method of claim 2, wherein:
    the system data clusters are also generated from environmental data associated with the one or more drilling systems of the type of drilling system,
    the one or more specific contexts are also associated with the environmental data, and
    the operational data includes derived operational data of the one or more drilling systems.

4. The method of claim 2, further comprising:
    accessing the system data clusters and the plurality of signatures when generating the plurality of dysfunction models, wherein the system data clusters and the plurality of signatures are generated based on the performance of the unsupervised learning.

5. The method of claim 4, further comprising:
identifying supervised input states that are associated with the one or more dysfunctions, wherein the plurality of dysfunction models are generated based on the supervised learning from data associated with:
the supervised input states,
the plurality of system data clusters, and
the plurality of generated signatures.

6. The method of claim 1, wherein:
metadata associated with generating each of the plurality of dysfunction models maps each of the plurality of dysfunction models to a respective failure mechanism based on the metadata including one or a more characteristics of a dysfunction of the plurality of dysfunctions, the first dynamic operational characteristic is associated with a torque and the first dysfunction corresponds to a twist off of a part of the type of drilling system,
a second dynamic operational characteristic is associated with a flow level and a second dysfunction corresponds to lost circulation of a wellbore fluid,
a third dysfunction is associated with a measurement of the electrical load, and
a fourth dysfunction corresponds to a stuck pipe.

7. The method of claim 1, further comprising:
assigning a confidence score to the dysfunction model of the at least two related multivariate dysfunction models, wherein the confidence score is assigned based on input system data of the type of drilling system, and wherein the dysfunction model of the at least two related multivariate dysfunction models is also selected based on the confidence score assigned to the dysfunction model of the at least two related multivariate dysfunction models.

8. The method of claim 1, wherein the one or more specific contexts of the type of drilling system are associated with input system data and include one or a combination of:
static operational characteristics of the type of drilling system,
dynamic operational characteristics of the type of drilling system,
static environmental characteristics of the type of drilling system, and
dynamic environmental characteristics of the type of drilling system.

9. The method of claim 1, wherein predicting the first dysfunction of the type of drilling system further includes predicting a probability of the first dysfunction occurring within the type of drilling system, the method further comprising:
determining whether an actionable output rule is met based on the probability of the first dysfunction occurring, wherein the actionable output rule specifies one or more actionable outputs to provide for controlling the type of drilling system; and
providing one or more actionable outputs for controlling the type of drilling system when the actionable output rule is met based on the probability of the first dysfunction occurring within the type of drilling system.

10. The method of claim 9, wherein the actionable output rule includes a pre-defined probability threshold of the first dysfunction for providing the one or more actionable outputs.

11. The method of claim 1, wherein:
the first dynamic operational characteristic is associated with a torque of the drilling system and the first dysfunction corresponds to a twist off of a part of the drilling system, and
the second dysfunction corresponds to a mechanical failure of the drilling system.

12. The method of claim 1, wherein the one or more specific contexts also include an environmental characteristic that is identified in the first metadata tag and not the second metadata tag.

13. A system comprising:
one or more processors; and
at least one computer-readable storage medium having stored therein instructions which, when executed by the one or more processors, cause the one or more processors to perform operations comprising:
gathering system data of a plurality of drilling systems to generate a plurality of dysfunction models for respectively predicting dysfunctions in each of the plurality of drilling systems, wherein the system data includes operational data of a type of drilling system;
clustering the system data of the plurality of drilling systems into a plurality of system data clusters based on an unsupervised learning process associated with a type of drilling system of the plurality of drilling systems;
identifying one or more specific contexts of the type of drilling system, wherein the one or more specific contexts identify the type of drilling system and a plurality of dynamic operational characteristics;
generating a plurality of signatures based on the plurality of system data clusters;
generating the plurality of dysfunction models by performing a supervised learning process from data associated with the system data clusters and the signatures associated with the plurality of system data clusters, wherein the one or more specific contexts are associated with the operational data of the type of drilling system;
generating a first metadata tag associated with a first dysfunction that:
identifies the type of drilling system, and
includes a first signature of the plurality of signatures, wherein the first signature represents a first dynamic operational characteristic of the plurality of dynamic operational characteristics;
generating a second metadata tag associated with a second dysfunction that:
identifies the type of drilling system, and
includes a second signature of the plurality of signatures, wherein the second signature represents a second dynamic operational characteristic of the plurality of dynamic operational characteristics;
tagging the plurality of dysfunction models for predicting the one or more dysfunctions with respective metadata tags that each include at least one of the plurality of signatures, the respective metadata tags associated with the one or more specific contexts of the type of drilling system and including the first metadata tag associated with the first dysfunction and the second metadata tag associated with the second dysfunction, wherein:
the first metadata tag is assigned to at least two related multivariate dysfunction models of the plurality of dysfunction models, and one or more other dysfunction models of the plurality of dysfunction models are tagged with a second metadata tag associated with the second dysfunction;

selecting a dysfunction model of the at least two related multivariate dysfunction models based on the one or more specific contexts of the type of drilling system and the first metadata tag; and predicting the first dysfunction of an operational drilling system by applying the selected dysfunction model, wherein:

the selected dysfunction model is applied to predict the first dysfunction while refraining from applying the one or more other dysfunction models that are tagged with the second metadata tag associated with the second dysfunction, and operation of the drilling system is updated to change the first dynamic operational characteristic based on the prediction of the first dysfunction of the type of drilling system to impact effects associated with the first dysfunction, wherein the change to the first dynamic operational characteristic results in a change to at least one of a flow level, a torque level, or a number of revolutions per minute (RPM) of the drilling system.

14. The system of claim 13, wherein the instructions which, when executed by the one or more processors, further cause the one or more processors to perform operations comprising:

identifying supervised input states that are associated with the one or more dysfunctions; and performing supervised learning based on data associated with the supervised input states, the system data clusters, and the signatures associated with the system data.

15. The system of claim 13, wherein the instructions which, when executed by the one or more processors, further cause the one or more processors to identify the one or more specific contexts of the type of drilling system.

16. The system of claim 15, wherein metadata associated with generating each of the plurality of dysfunction models maps each of the plurality of dysfunction models to a respective failure mechanism based on the metadata including one or a more characteristics of a dysfunction of the plurality of dysfunctions.

17. The system of claim 13, wherein the one or more specific contexts of the type of drilling system include one or a combination of:

static operational characteristics of the type of drilling system, dynamic operational characteristics of the type of drilling system, static environmental characteristics of the type of drilling system, and dynamic environmental characteristics of the type of drilling system.

18. A non-transitory computer-readable storage medium having stored therein instructions which, when executed by a processor, cause the processor to perform operations comprising:

generating a plurality of system data clusters from operational data associated with one or more drilling systems of a type of drilling system;

identifying one or more specific contexts of the type of drilling system, wherein the one or more specific contexts identify the type of drilling system and a plurality of dynamic operational characteristics;

generating a plurality of signatures based on the plurality of system data clusters;

providing a plurality of dysfunction models for predicting one or more dysfunctions in a drilling system of the one or more drilling systems based on the one or more specific contexts of the type of drilling system, wherein the one or more specific contexts are associated with the operational data;

generating a first metadata tag associated with a first dysfunction that:

identifies the type of drilling system, and includes a first signature of the plurality of signatures, wherein the first signature represents a first dynamic operational characteristic of the plurality of dynamic operational characteristics;

generating a second metadata tag associated with a second dysfunction that:

identifies the type of drilling system, and includes a second signature of the plurality of signatures, wherein the second signature represents a second dynamic operational characteristic of the plurality of dynamic operational characteristics;

tagging the plurality of dysfunction models for predicting the one or more dysfunctions with respective metadata tags that each include at least one of the plurality of signatures, the respective metadata tags associated with the one or more specific contexts of the type of drilling system and including the first metadata tag associated with the first dysfunction and the second metadata tag associated with the second dysfunction, wherein:

the first metadata tag is assigned to at least two related multivariate dysfunction models of the plurality of dysfunction models, and one or more other dysfunction models of the plurality of dysfunction models are tagged with a second metadata tag associated with the second dysfunction;

selecting a dysfunction model of the two related multivariate dysfunction models based on the type of drilling system and the first metadata tag; and predicting the first dysfunction of the drilling system by applying the selected dysfunction model, wherein:

the selected dysfunction model is applied to predict the first dysfunction while refraining from applying the one or more other dysfunction models that are tagged with the second metadata tag associated with the second dysfunction, and operation of the drilling system is updated to change the first dynamic operational characteristic based on the prediction of the first dysfunction of the type of drilling system, wherein the change to the first dynamic operational characteristic results in a change to at least one of a flow level, a torque level, or a number of revolutions per minute (RPM) of the drilling system.

* * * * *